United States Patent
Peeters

(10) Patent No.: US 7,124,023 B2
(45) Date of Patent: Oct. 17, 2006

(54) TRAFFIC FLOW DATA COLLECTION AGENTS

(75) Inventor: Eric Peeters, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 176 days.

(21) Appl. No.: 10/734,428

(22) Filed: Dec. 12, 2003

(65) Prior Publication Data

US 2005/0131628 A1    Jun. 16, 2005

(51) Int. Cl.
G01C 21/34 (2006.01)
G09B 29/00 (2006.01)

(52) U.S. Cl. .............. 701/209; 701/201; 701/211; 701/213; 340/995.19; 340/995.23

(58) Field of Classification Search .......... 701/201, 701/204, 209, 210, 211, 213, 117; 340/992, 340/995.13, 995.23, 994, 995.17, 995.19, 340/995.25
See application file for complete search history.

(56) References Cited

U.S. PATENT DOCUMENTS

| 5,919,246 | A | * | 7/1999 | Waizmann et al. | 701/209 |
| 6,351,709 | B1 | * | 2/2002 | King et al. | 701/210 |
| 6,480,783 | B1 | * | 11/2002 | Myr | 701/117 |
| 6,754,580 | B1 | * | 6/2004 | Ask et al. | 701/117 |
| 6,785,606 | B1 | * | 8/2004 | DeKock et al. | 701/117 |
| 6,853,915 | B1 | * | 2/2005 | Hubschneider et al. | 701/209 |
| 6,862,542 | B1 | * | 3/2005 | Lockhart et al. | 702/76 |
| 2003/0171094 | A1 | * | 9/2003 | Kawai | 455/3.01 |
| 2004/0239568 | A1 | * | 12/2004 | Masutani | 343/700 MS |
| 2006/0007022 | A1 | * | 1/2006 | Endo et al. | 340/995.12 |

* cited by examiner

Primary Examiner—Tan Q. Nguyen
(74) Attorney, Agent, or Firm—Kent Chen

(57) ABSTRACT

A method and apparatus to compute a fastest route is described. The method uses the speed of a plurality of informer vehicles as data collection agents to summarize traffic conditions. A central processing point collects the data. Navigation systems in receiving vehicles use the summarized traffic conditions data to generate faster routes from a current location to a destination.

12 Claims, 4 Drawing Sheets

TRAFFIC FLOW DATA COLLECTION AGENTS

BACKGROUND

Modern navigational systems have become a popular option in new automobiles. In such systems, a driver or a passenger inputs a desired destination. A sensor, such as a global positioning system (GPS) sensor, then determines the location of the automobile. A navigation system processor uses the driver input and the sensor output to compute a route from the location to the destination. The route is typically the most direct route available using freeways.

A storage device, such as a compact disk, a DVD, a hard drive, a non-volatile semiconductor memory or other equivalent storage mechanism typically provides a map of many available routes to the navigation system. The storage mechanism may be updated every few months, or every few years to account for new roads being built, road closures and other changes due to construction. However no mechanism is provided to easily determine short term changes that occur in days, hours or even minutes. Such changes that may include accidents, traffic jams or roadwork can easily make a particular route more or less desirable.

Thus an improved navigation system that takes into account real time data is needed.

SUMMARY

A navigation system that incorporates continuously updated data into designing a driving route is described. The navigation system receives destination information from a driver. The navigational system also includes a sensor to determine the location of the vehicle. A receiver receives updated traffic information, the updated traffic information and uses the updated traffic information to generate a preferred route.

DETAILED DESCRIPTION

A navigation system that takes into account real time traffic conditions is described. As used herein, "real time" means that the data is updated frequently enough to take into account traffic accidents, and rush hour slowing, thus the data is not necessarily updated immediately or even continuously. The navigation system uses information collected from a plurality of data collectors, typically other "informer" vehicles traveling on roads. A processing point summarizes data from the informer vehicles and distributes the data to a navigation system in a receiver vehicle. The navigation system then uses the traffic data to identify a quickest route from a current position to a destination position.

Figure 1:
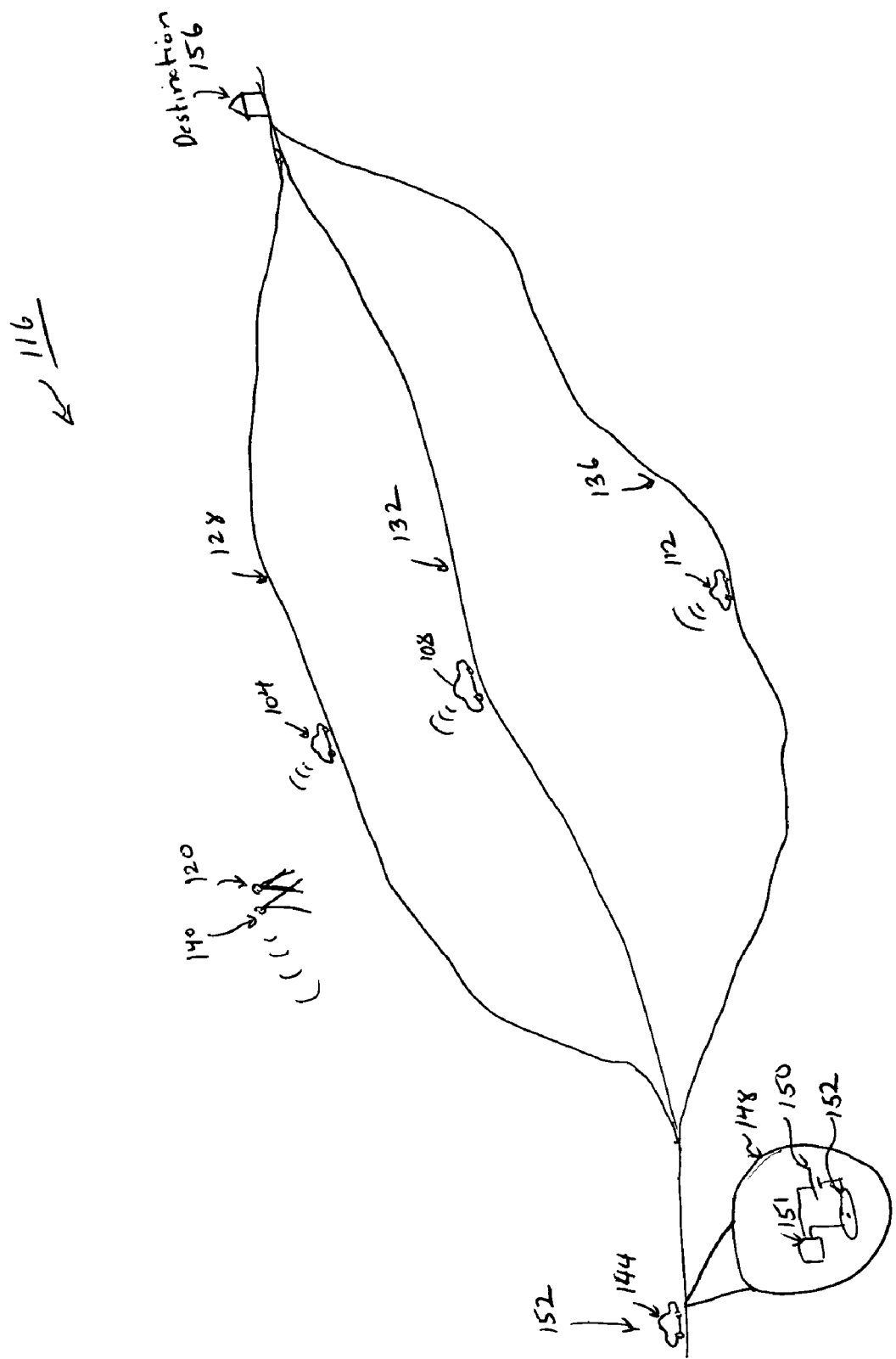
FIG. 1 is an overview of the network to provide real time traffic data to a navigation system.

FIG. 1 shows one system to collect speed data. In FIG. 1, a plurality of informer vehicles 104, 108, 112 are located around a city 116. The location of each informer vehicle may be determined using a GPS system. Each vehicle communicates its location and speed to a central processing point 120 (or station). Although throughout the specification, a central processing point is described as the receiving point for signals from informer vehicles, and also as the processor of information, an alternate embodiment uses direct communication between the informer vehicles and the receiving vehicle 144. When direct communication is used between the informer vehicles 104, 108, 112 and the receiving vehicle, much of the electronics that will be described in central processing point 120 is incorporated into receiving vehicle 144.

In one embodiment, a speed sensing system that is also coupled to a speedometer determines the informer vehicle speed. In an alternate embodiment, processors at the processing point determine the informer vehicle speed by tracking the informer vehicle using a periodic stream of informer vehicle locations. From the vehicle's changing position, the speed of the vehicle may be computed.

In one embodiment, receiving vehicle 144 also serves as an informing vehicle. Using a GPS system integral to a navigation system to provide traffic information allows the Navigation system GPS system to have dual uses. First, the GPS navigation system determines current vehicle location during navigation. Secondly, the GPS system provides transmission data that identifies the current location of the vehicle and directly or indirectly provides speed data. Although use of the navigation system GPS for informing vehicles is not required, using the navigation system GPS for the dual purpose reduces costs.

After the data is received at processing point 120, a processing system 124 sorts through the data and determines the speed of vehicles at various points along each route 128, 132, 136. One method of computing the maximum speed at points along each route involves selecting the fastest moving vehicle within a predetermined distance of a point. Selecting the fastest vehicle avoids data which may result from slow drivers, traffic lights, and other aberrations in the data. In areas with special lanes such as toll lanes and carpool lanes which allow movement faster than the general flow of traffic; the system may take a median speed or a speed of the $25^{th}$ percentile vehicle (the $25^{th}$ fastest vehicle out of 100 vehicles) or another preselected cut off point.

A transmitter 140 transmits the data needed to determine the maximum speed of vehicles on each route to receiving vehicle 144. In one embodiment, the route speeds may be determined at processing point 120 prior to transmission. In a second embodiment, the navigation system in receiving vehicle 144 determines the route speed using raw data received from transmitter 140.

Receiving vehicle 144 includes a navigation system 148 that receives the transmitted real time data. A receiving vehicle battery 150 or generator powers a navigation system 148. Navigation system 148 combines the real time transmitted data with possible routes retrieved from a memory 152. Memory 152 stores the possible routes or "map" of the general geographic area. Memory 152 is typically a hard drive, DVD or CD drive, ROM or other equivalent media for storing large amounts of data.

Navigation system 148 includes a processor 151 that selects possible routes from memory and combines the selected routes with real time data indicating the speed at various points on the selected routes. Using the data, the processor computes a fastest route between a current location 152 and a desired destination point 156. As used herein "fastest route" is not necessarily the absolute fastest route, but instead is the preferred route and relatively the quickest route given limitations set by the driver and the system programmers. Such driver limitations may include but is not limited to: favoring or avoiding freeways, taking or avoiding car pool lanes, and other such instructions. Receiving vehicle 144 provides the selected route as an option to a driver. The driver may then pick either the fastest route or one of the alternate selected routes.

Figure 2:
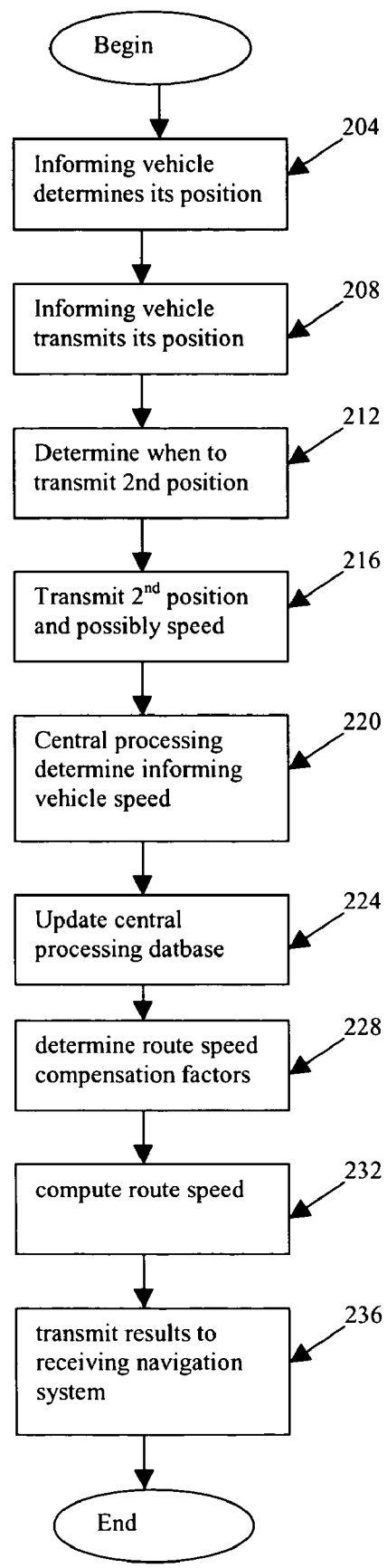
FIG. 2 is a flowchart that describes operation of the network.

FIG. 2 is a flow chart that shows operation of the overall system. In block 204 an informing vehicle determines its position at time x. Determination of position may be done by a variety of techniques, but the simplest technique is via a GPS system that uses a series of satellite transmissions to compute the informing vehicle position at time x. In block 208, a transmitter transmits the informing vehicle position at time x to the processing station.

In block 212, the informing vehicle determines when to transmit a second position. When the second transmission is needed, the informing vehicle transmits the second position data and in some embodiments, the informing vehicle speed in block 216. During the time interval "t" between transmission of first position data and second position data, the vehicle should travel a sufficient distance such that inaccuracies of a GPS system (typically 10 feet) are not significant. The time interval "t" between transmissions should also be long enough that the amount of transmissions received by the processing station is not overwhelming. However, the time interval between transmissions should not be so long that many miles are traveled before a second transmission. Long time intervals between transmissions may render an average speed meaningless in determining the speed of the informing vehicle at a point.

When informing vehicle is traveling at high speeds, more frequent transmissions of data may be desirable. Thus in one method of determining when a transmission should occur, the informing vehicle may adjust the frequency of transmissions to match the distance covered. Adjusting the frequency of transmission according to the distance traveled avoids overloading the central processing point with multiple transmissions from a parked, idling or stopped informing vehicle. In one embodiment, the informing vehicle computes the distance covered and transmits the data to the processing system 124.

In an alternate embodiment of determining when a transmission should occur, the central processing point periodically prompt the incoming vehicle for new position data in a polling arrangement. Using processing point requests helps prevent overload of the processing point. However, such a system also relies on two way communications. Thus, informing vehicle would have to be designed to receive the prompt signals.

When the informing vehicle does not compute the speed or distance traveled, either the central processing point or the receiving vehicle processes raw data to determine the informing vehicle's vehicle speed. In the illustrated embodiment, the central processing point determines the informing vehicle speed in block 220. The data is added to an updated real time database in block 224.

The central processing point processes the database data to determine approximate route speeds. Statistical measures including but not limited to computing mean speed or median speed, may be used to determine the real time route speed. In block 228, central processing point uses known parameters to adjust the computed real time route speed. For example, adjustments may be made after determining which cars are in a carpool lane and which cars not in the carpool lane. On side streets, measures may also be applied to eliminate cars that are idling. Typically, such tweaking may be done by eliminating data that deviates from a substantial average.

In block 232, the processing point determines a statistical average or median speed at each point accounting for all relevant data. This average or median speed is stored in a database for transfer to a receiving car when a receiving car requests data for the corresponding route.

Figure 3:
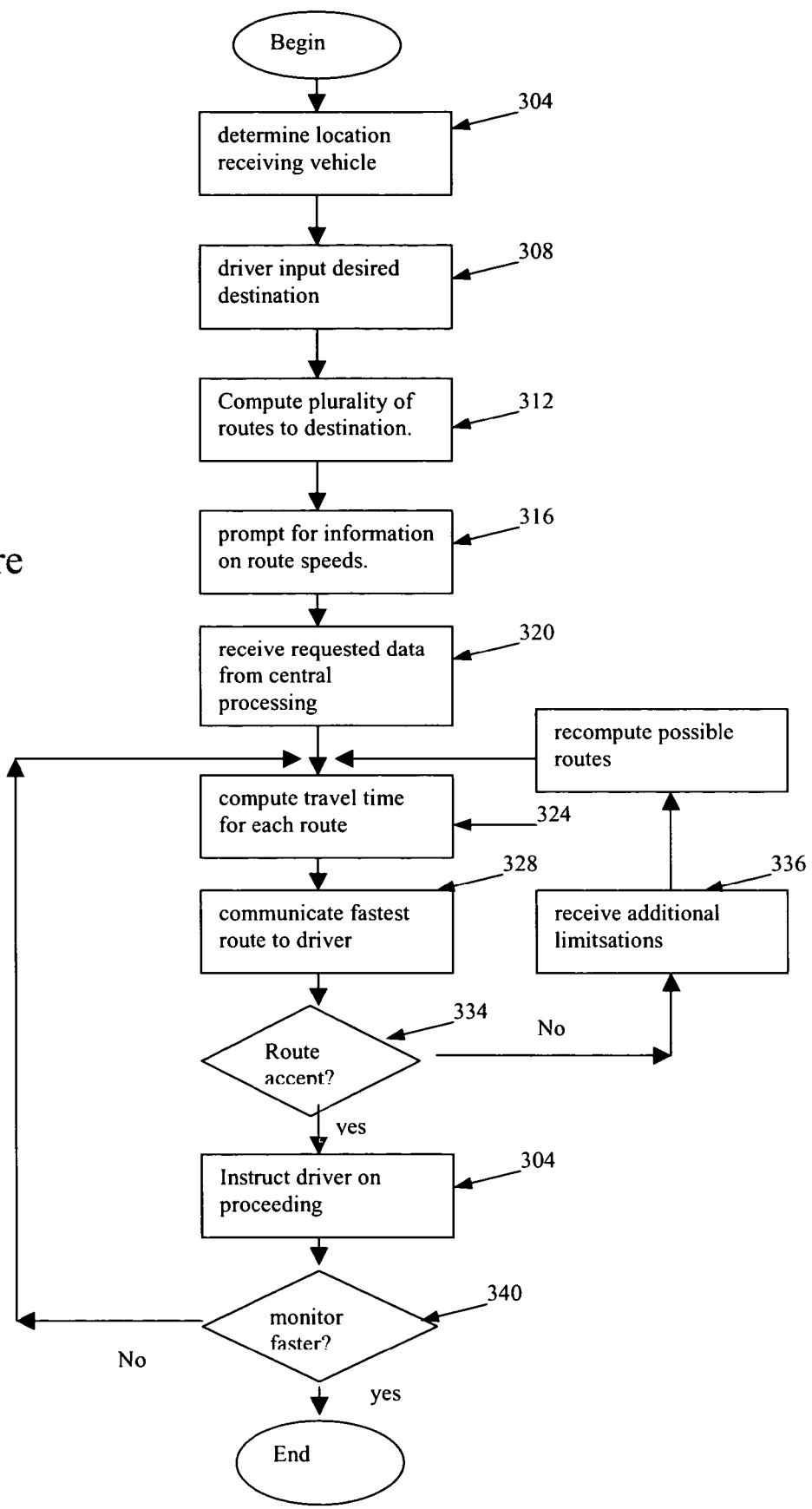
FIG. 3 is a flowchart that describes operation of the Navigation system.

FIG. 3 is a flowchart that illustrates navigation system operation. In block 304, a GPS system determines a current location of the navigation system. In block 308, a driver inputs a desired destination. The driver input may be received via keyboard, voice input, touchpad, or other methods known to those of skill in the art.

In block 312, the navigation system computes a plurality of routes from the current location to the desired destination. The plurality of routes may include various driver selectable instructions, including instructions to favor or avoid freeways, to select a shortest route or a fastest route, to use or avoid tolls, to use or avoid carpool lanes, etc.

In block 316 to block 336, the navigation system integrates real time information into the route computation. In block 316, the navigation system prompts the central processing point for information on vehicle speeds along the routes between the current location and the destination. In block 320, the navigation system receives the requested data from the central processing point. The received data may include statistical computations of vehicle speeds along various points in the route between the current location and the destination. Alternately, the transmission may include primarily raw data forwarded from the informing vehicles, or a summarized or compressed version of the raw data.

After receiving or determining the approximate speeds along each route, the navigation system computes, in block 324, the time to the destination using each route. Multiplying the distance traveled along each route with the speed of informing vehicles along each route generates a good estimate of travel time. More sophisticated systems may use large quantities of data to compute the speed along the route at periodic points, such as taking speeds at periodic distances, such as every hundred feet, and integrating the information over the relevant distances.

The navigation system communicates the fastest computed route to the driver in block 328. The driver may elect to accept the route, to reject the route or to accept only portions of the route in block 332. If the driver decides in block 334 to make changes to the route, the navigation system receives the additional input from the driver in block 336 and computes a new route using the limitations imposed by the driver. When the driver accepts the route in block 334, the navigation system instructs the driver on how to proceed along the selected route.

Traffic conditions however are not static. The fastest computed route may not remain the fastest computed route while the vehicle is en-route to the destination. Accidents that occur while traveling along the selected route may result in substantial slowing along the selected route. Thus even after the receiving vehicle has started proceeding along the route, the navigation system continues to periodically request and/or receive real time traffic data from the central processing point in block 340. The navigation system also continues to compute the fastest route to the destination from the changing current position. If a faster route appears, possibly due to a slow down along the current route or a clearing along a previously clogged route, the navigation system may offer the driver the option of adjusting the route to take advantage of the faster route.

Figure 4:
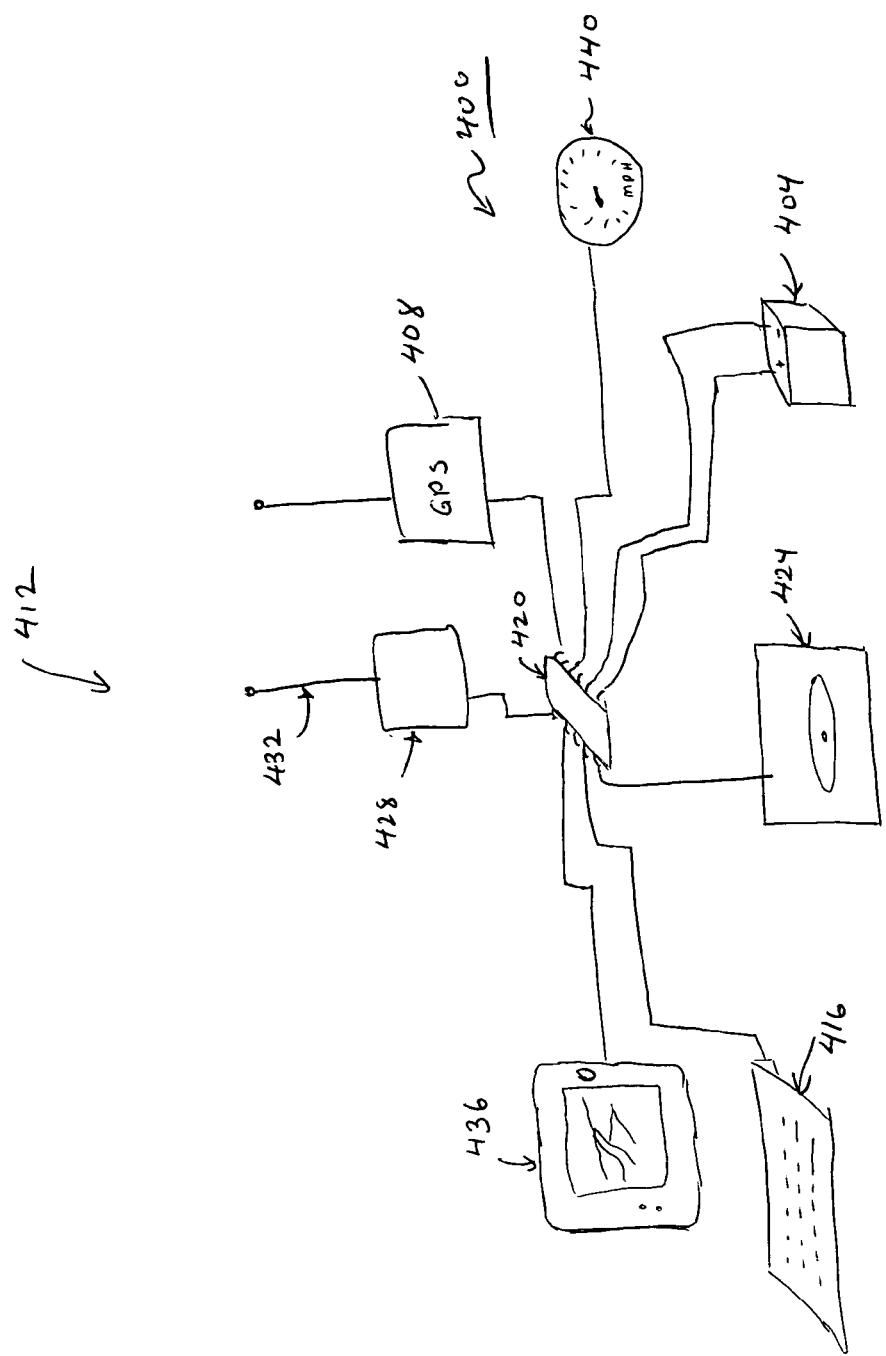
FIG. 4 is a schematic illustrating the components of the navigation system.

FIG. 4 is an image of a typical navigation system that integrates the received real time data with navigational software to determine a fastest route. The navigation system of FIG. 4 is also configured to serve as a data collection system in an informing car that provides real time traffic data to the central processing point.

In FIG. 4, a power supply 404 powers navigation system 400. Power supply 404 may be an automobile battery or an automobile generator. Navigation system 400 also includes a GPS system 408 for determining the current location of the vehicle 412 from a plurality of satellites.

An input device 416 such as a touchpad, keyboard or speech recognition system is integrated into the navigation system. Input device 416 receives destination information from a driver. Processor 420 uses current destination from the GPS system 408 and destination information from input device 416 along with map data stored on a storage device 424 to compute potential routes.

A transmitter and receiver 428 including an antenna 432, communicates with a central processing point to request real time traffic information along specific routes. In an alternate embodiment, no request is made. Instead receiver 428 receives a continuous broadcast of all real time traffic data related to a large geographic area and filters the data to obtain relevant data. The technique of communication and/ or broadcast may vary, but typically involves a Federal Communication Commission approved technique. The communication by transmitter and receiver 428 may be synchronous or asynchronous. In one embodiment, communications utilize a cellular network used for cellular telephone communications. In another embodiment, a broadcast similar to a radio broadcast is used. In areas with available wireless internet access, such as wi-fi "hotspots", the vehicle may communicate with the tower or directly with informer vehicles using accepted protocols, including internet protocols, while passing though the hotspot coverage area. The data may then be buffered in a navigation system memory for use in route computations.

In noncontinuous communication techniques where constant communication is not maintained, such as a wi-fi hotspot system, the informer vehicle information is buffered. When the navigation system is operating as an informing vehicle, a memory buffer such as RAM, a hard drive, or other storage mechanism stores GPS data, the time associated with each GPS data point and sometimes associated speed data. The navigation system transmits the data in storage when the navigation system reaches an area that enables communications. Likewise, in noncontinuous communications, when the navigation system is creating fastest routes in a receiving vehicle, the navigation system downloads informer vehicle GPS data or a summarized version of the data into a memory buffer such as RAM, a hard drive, or other storage mechanism stores when the navigation system is in an area that enables communications.

A processor 420 processes the real time traffic information to generate a fastest route. The fastest route is displayed on an output device 436 which typically includes a screen and possibly a speaker to provide voice instructions.

In one embodiment, navigation system 400 also serves as a data collection agent in an informing vehicle. When used as an informing vehicle that transmits speed data, the navigation system may be coupled to speed sensing electronics 440 which may include a speedometer. In one embodiment, navigation system 400 transmits speed data from speed sensing electronics 440 along with current position information obtained from GPS system 408 to provide the speed of the vehicle. In an alternate embodiment, the navigation system 400 is not coupled to the speed sensing electronics. Instead, the navigation system 400 upon request, or at predetermined intervals, transmits position information to the central processing point and allows the processing point or the receiving vehicle to compute a speed.

The preceding specification includes many details that are provided to assist in understanding the invention, however are not necessary to the invention. For example, although a central processing point is described, the central processing point may easily be eliminated and the electronics incorporated into the receiving vehicle. Thus, the scope of the invention should only be defined by the claims, as originally presented and as they may be amended, and their equivalents. These claims should be interpreted to encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A navigation system comprising:
   a receiver to receive updated route speed information;
   an input device to receive a destination point from a driver,
   a GPS locator to identify the position of the receiver;
   a computational system to select a fastest route from the position of the receiver to the destination point using the updated route speed information; and,
   an output device to communicate the fastest route to the driver wherein the route speed at a point is computed based on the fastest moving vehicle near the point.

2. The navigation system of claim 1 wherein the location of a vehicle is used to determine whether a fastest moving vehicle that is in a carpool lane thereby enabling a driver to select routes based on carpool lane speeds.

3. A system in a vehicle, the system comprising:
   a receiving unit in the vehicle, the receiving unit for receiving transmission signals from a plurality of other vehicles, each other vehicle transmitting a location and a speed;
   a processing unit in the vehicle, the processing unit that processes the location and speed of each of the other vehicles to determine a route speeds at various points on streets in a region; and,
   a transmitting unit in the vehicle, the transmitting unit to transmit route and speed information of the vehicle to the other vehicles.

4. The system of claim 3 further comprising:
   a navigation unit to receive the route speed information and to combine the route speed information with a current position received from a GPS signal to plot a fastest route to a destination from the current position received from the GPS signal.

5. The navigation system of claim 4 wherein the speed data is received from a speed sensing sensor.

6. The system of claim 3 wherein the transmitting unit receives signals from a navigation unit and only transmits route speeds at points requested by a navigation unit in one of the other vehicles.

7. A method of computing a fastest route in a vehicle from a current location of the receiving vehicle to a destination comprising:
   determining a current location using a GPS system;
   receiving information on a destination point;

receiving updated route speed information from other vehicles and determining a fastest route based on a speed of the fastest moving vehicle near each point; and, computing a fastest route from the current location to the destination point taking into account the updated route speed information.

8. The method of claim 7 wherein the receiving of updated route speed information is received from a central processing point.

9. The method of claim 7 wherein the receiving of updated route speed information is received from a informing vehicle.

10. The method of claim 7 wherein the updated route speed information is generated by monitoring the speed of informer vehicles along the fastest route.

11. The method of claim 7 wherein the receiving vehicle also serves as an informing vehicle, the method further comprising:

generating updated route speed information by monitoring the speed of the receiving vehicle; and, transmitting the position and speed of the receiving vehicle.

12. The method of claim 7 further comprising determining if the fastest moving vehicle is in a carpool lane thereby enabling a driver to select routes based on carpool lane speeds.

* * * * *